J. Beaudreau,
Sawing Shingles,

N°39,110.    Patented July 7, 1863.

Witnesses:    Inventor:

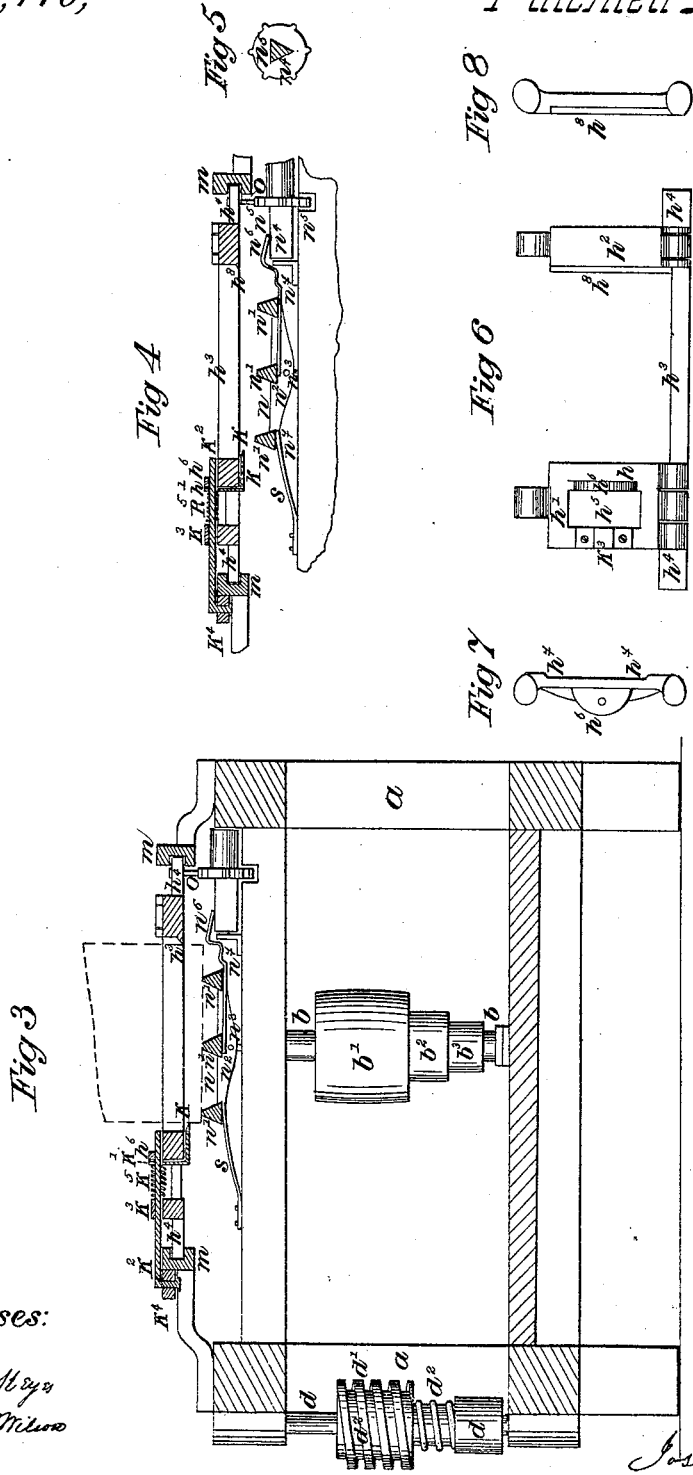

UNITED STATES PATENT OFFICE.

JOSEPH BEAUDREAU, OF FOND DU LAC, WISCONSIN.

IMPROVEMENT IN SHINGLE-MACHINES.

Specification forming part of Letters Patent No. 39,110, dated July 7, 1863.

*To all whom it may concern:*

Be it known that I, JOSEPH BEAUDREAU, of Fond du Lac, in the county of Fond du Lac, in the State of Wisconsin, have invented a new, improved, and useful Shingle-Machine; and I do hereby declare that the following is a full and exact description thereof, reference being had to the accompanying drawings, and to the letters of reference marked thereon.

The nature and superiority of my invention consists of such an arrangement and combination of newly invented and constructed (in connection with older parts of) machinery, so as to greatly facilitate the manufacture of shingles by lessening the amount of labor connected therewith. Not only so, but such is the construction of my invention and combination, that blocks or bolts of wood to be sawed into shingles may be extended to any desirable or possible number by lengthening the endless chain-carriage and extending the length of the frame to correspond with the carriage, which will appear evident at a single glance of the eyes, and yet, if desirable, but a single block or bolt can be sawed.

To enable others skilled in the art to make and use my invention, I will proceed and describe its construction and operation.

Figure 1:
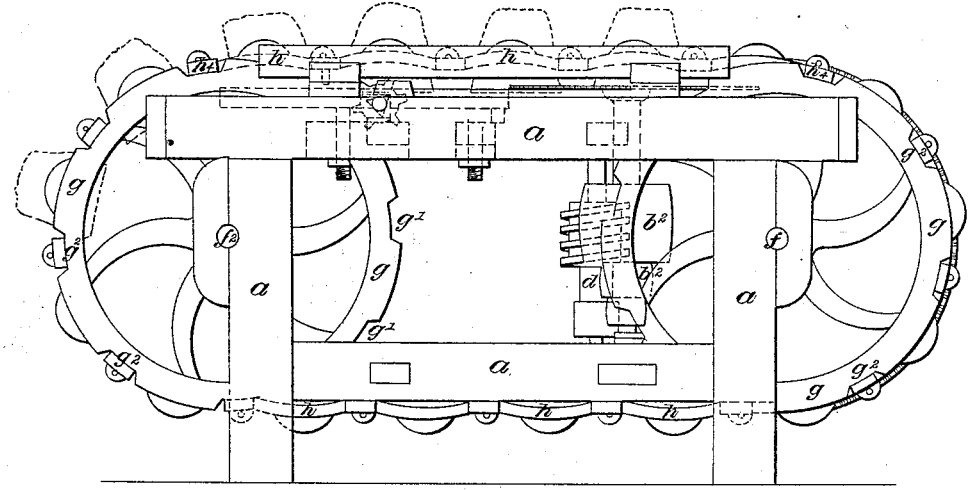
Figure 2:
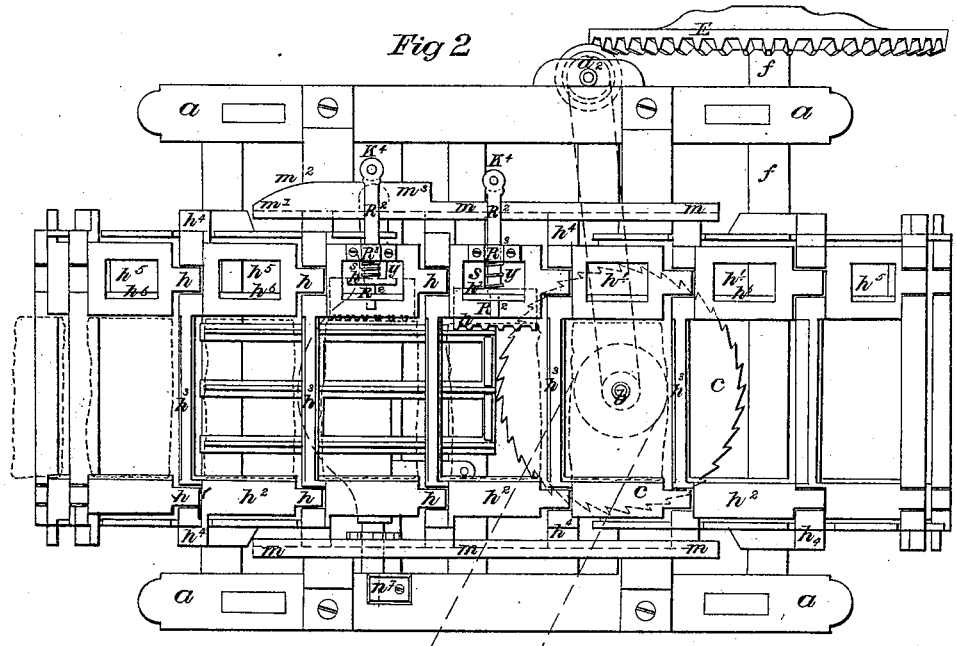

Figure 1 is a longitudinal elevation. Fig. 2 is a top view. Fig. 3 is a cross or transverse sectional view. Figs. 4, 5, 6, 7, and 8, are details of different parts or portions of the machine, as seen in Figs. 1, 2, and 3, the letters referring to the same parts.

The frame of the machine is seen at $a\ a\ a\ a$. There is an upright shaft, $b$, on the upper end of which the saw $c$ is attached, and at the lower end, $b'$, the motive power is applied, and from $b^2$ a belt passes to shaft $d$, on which is placed a spiral or worm screw, $d'$, so arranged as to work or revolve with the shaft, and yet left free to be depressed by resting on a spiral spring, $a^2$, so that when the saw strikes a knot it yields to the extra resistance, thereby easing the working of the saw. The spiral screw works into the cogs of the bevel-wheel $e$, which is attached to shaft $f$, carrying the wheels $g$. On the shafts $f$ and $f^2$ are attached flanged wheels, with notches made in the flanges $g'$, to carry, move, guide, and support an endless-chain carriage, $h$, the flanges being on the outer side of the wheels. An endless-chain carriage, $h$, is constructed of iron hinged links, open $h'$ and solid $h^2$, with cross bars or ties $h^3$. The cross bars or ties extend beyond the width of the body of the carriage $h^4$, constituting a bearing for the carriage in its revolutions and a guide when passing through the way $m$, thus keeping the carriage in position while passing over the saw $c$. The bearing also works in the notches of the flanges $g^2$. The front links, $h'$, have an opening, $h^5$, with upward projections on the back bar, $h^6$, through which the shank of the dog $k$ passes, and should move easily. On the under side or surface of the front link there is at each end a groove or slide, $h^7$, in which the dog moves, and by which it is held and sustained in position. The back link, $h^2$, has on its inner face and at the lower edge a wedge-shaped projection, $h^8$, with or without teeth, as a fellow to the dog $k$, to assist in holding in position the block or bolt as it passes over the saw $c$, and in its revolutions with the carriage $h$. A movable dog, $k$, is placed in the opening of the link $h^5$ of the carriage. The dog, at its back end is constructed with an upward projection, $k'$, through which the shank $k^2$ passes sufficiently to extend through the upward projection $h^6$ of the front link. The shank of the dog is fastened in the upward projection $k'$ of the dog, and held in the box $k^3$ and $h^6$, and thus kept in position with the assistance of $h^7$. On the outer end of the shank at $k^4$ a roller is attached to facilitate its movements past the wedge-shaped projection of the way $m$ while withdrawing the dog out of the block. A spiral spring, $k^5$, is placed around the shank, between the projection $k'$ and the box $k^3$, designed to regulate its movement, specially to drive the dog into the block at $m^3$, and hold it firmly in position while passing over the saw. On the outer side of the front way there is a wedge-shaped projection, $m'$, designed to operate on the spring $k^5$ of the dog, detaching the dog from the block at $m^2$, so that the block may fall down on the tilting-table $n$, and then at $m^3$, where there is a right-angled off-set. Let the spring drive the dog into the block again before it passes over the saw. Under the carriage on the frame there is placed a tilting-table, $n$, on which the blocks to be sawed into shingles are placed and tilted, changing the butts and tips of the shingle to alternate ends of the block. The table is made of three (more or less) bent bars, $n'$, running lengthwise with the machine and resting on bars $n^2$, so arranged on their under side at $n^3$ with a fulcrum as to make a rocking movement. The tilting movement is governed and operated by means of a triangular shaft, Fig. 5, $n^4$, on which is placed a wheel with six cogs or arms, Fig. 5, $n^5$, so that by means of pin $o$, Figs. 3 and 4, attached to the under side of one of the back bearings, between the carriage and the way, the shaft $n^4$ is made to revolve or move one-sixth of its diameter at each revolution of the pin $o$; and thus, when the angle of the triangled shaft is up, it elevates one side of the table $n^6$ and depresses the spring $s$, and then, when the side of the triangled shaft is up, the spring $s$ elevates the other side of the table $n^7$.

The triangular shaft, Figs. 4 and 5, $n^4$, is held in position by the box $n^6$, and the inner end by a right-angular arrangement, $n^7$ $n^6$, Fig. 2, top view, and $n^7$, Figs. 3 and 4.

What I claim as my invention, and desire to secure by Letters Patent, is—

1. The endless-chain carriage, constructed of segment-formed links $h'$ $h^2$, cross bars or ties $h^3$, the latter at each end projecting beyond the links, and forming guides $h^4$, which travel in ways $m$, and thereby support the bolts as they are successively fed to the saw, in a proper position to have a shingle cut from the under side of each bolt, in combination with the tilting-table $n$, and horizontally-revolving circular saw $c$, when the whole is arranged to operate in the manner and for the purpose specified.

2. The tilting-table $n$ and triangular shaft $n^4$, in combination with the spring $s$ and arm $n^6$, or their equivalents, when arranged to operate in the manner and for the purpose specified.

3. The pins $o$, projecting from the under side of the endless-chain carriage, in combination with the gear or toothed wheel $n^5$ and triangular shaft $n^4$, when arranged to operate in the manner and for the purpose specified.

4. The worm or screw $d'$ and helical spring $d^2$, in combination with the beveled toothed cog-wheel $c$ and shaft $f$, when arranged to operate in the manner and for the purpose specified.

In witness that I claim the foregoing, I have hereunto set my hand.

JOSEPH BEAUDREAU.

In presence of—
 W. F. KELLOGG,
 JOHN S. McDONALD.